United States Patent
Lorenz et al.

(10) Patent No.: US 7,890,468 B2
(45) Date of Patent: Feb. 15, 2011

(54) ROLLBACK SUPPORT IN DISTRIBUTED DATA MANAGEMENT SYSTEMS

(75) Inventors: Dean Har'el Lorenz, Haifa (IL); Roman Vitenberg, Oslo (NO); Alan J. Wecker, Misgav (IL)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 11/947,176

(22) Filed: Nov. 29, 2007

(65) Prior Publication Data
US 2008/0154980 A1    Jun. 26, 2008

(30) Foreign Application Priority Data
Dec. 21, 2006 (GB) .................. 0625698.6

(51) Int. Cl.
G06F 7/00    (2006.01)

(52) U.S. Cl. .................................... 707/653
(58) Field of Classification Search ............... 707/200, 707/684, 653
See application file for complete search history.

(56) References Cited

U.S. PATENT DOCUMENTS

| | | | |
|---|---|---|---|
| 5,893,155 A | 4/1999 | Cheriton | |
| 6,185,577 B1 | 2/2001 | Nainani et al. | |
| 6,457,021 B1 | 9/2002 | Berkowitz et al. | |
| 2004/0254964 A1 | 12/2004 | Kodama et al. | |
| 2006/0026219 A1* | 2/2006 | Orenstein et al. | 707/204 |

* cited by examiner

Primary Examiner—Apu M Mofiz
Assistant Examiner—Ajith Jacob
(74) Attorney, Agent, or Firm—Jon. A. Gibbons; Fleit Gibbons Gutman Bongini & Bianco PL

(57) ABSTRACT

A rollback support method for transactions a node among nodes in a distributed system, including modifying a disposable cache copy of data as part of transaction, propagating a version state and/or a data state of the modified cache to any of the nodes, verifying non-violation of a transaction semantic and/or a replication policy relating to the transaction, committing the transaction to any nodes if successful, revising a version state of other reliable replicas and disposable cache copies in the system based on the version state of the modified disposable cache copy, the disposable cache copies being members of a membership-based view, and updating a data state of other reliable replicas in the system based on the data state of the modified copy, and aborting the transaction if it fails, including restoring the disposable cache copy based on any reliable replicas and/or disposable cache copies in the system.

16 Claims, 6 Drawing Sheets

ROLLBACK SUPPORT IN DISTRIBUTED DATA MANAGEMENT SYSTEMS

CROSS-REFERENCE TO RELATED APPLICATIONS

This application is based upon and claims priority from prior Great Britain Patent Application No. 0625698.6, filed on Dec. 21, 2006 the entire disclosure of which is herein incorporated by reference.

FIELD OF THE INVENTION

The present invention relates to computer-implemented distributed data management system in general, and in particular to rollback support therefor.

BACKGROUND OF THE INVENTION

In distributed data management systems, where data are stored on multiple computer nodes, various computer users and programs often require concurrent access to same data. When a transaction is to be performed on the data stored at one node, the effect that the transaction has on the data often needs to be reflected by the data stored at other nodes in the distributed system.

Existing distributed systems typically use transaction processing for maintaining a database in a known, consistent state, by ensuring that any operations carried out on the database that are interdependent are either all completed successfully or all cancelled successfully. If all operations of a transaction are completed successfully, the transaction is "committed" by the distributed system, and all changes to the database are made permanent. This is typically done using a commit operation. If any part of the transaction fails before it is committed, the database is restored back to the state it was in before the transaction began. This is done using a rollback operation.

One approach for providing rollback support requires logging all changes to data and undoing each change when a rollback is required. However, this approach has limited applicability, as only modifications that are reversible are supported. This approach also requires an elaborate logging mechanism.

SUMMARY OF EMBODIMENTS OF THE INVENTION

The present invention in embodiments thereof discloses novel systems and methods for rollback support in distributed data management systems.

In one aspect of the present invention a method is provided for providing rollback support for a transaction initiated at a node, the node being one of a plurality of nodes in a distributed system, at least one of a reliable replica and a disposable cache copy of a data unit corresponding to the transaction being stored on the plurality of nodes, the data unit including a version state and a data state, the method including modifying a disposable cache copy of the data unit corresponding to the transaction at the node to obtain a modified disposable cache copy, in response to the transaction, propagating at least one of a version state and a data state corresponding to the modified disposable cache copy to one or more of the plurality of nodes in the distributed system, verifying a non-violation of at least one of a transaction semantics and a replication policy, where the non-violation corresponds to the transaction, committing the transaction to at least one of the plurality of nodes, if the transaction is successful, the committing step includes revising a version state of a plurality of reliable replicas and a plurality of disposable cache copies in the distributed system based on the version state of the modified disposable cache copy, the plurality of disposable cache copies being members of a membership based view, and updating a data state of a policy based number of reliable replicas in the distributed system, based on the data state of the modified disposable cache copy of the node, and aborting the transaction if the transaction fails, the aborting step including restoring the disposable cache copy at the node based on at least one of the plurality of reliable replicas and the plurality of disposable cache copies in the distributed system.

In another aspect of the present invention a system is provided for managing a transaction in a distributed system, the distributed system including a plurality of nodes, a copy of a data unit corresponding to the transaction being stored on each of the plurality of nodes, the copy being at least one of a reliable replica and a disposable cache copy, the data unit including a version state and a data state, the system including a modifying module, the modifying module modifying a disposable cache copy of the data unit corresponding to the transaction at the node to obtain a modified disposable cache copy, in response to the transaction, a propagating module, the propagating module propagating at least one of a version state and a data state corresponding to the modified disposable cache copy to one or more of the plurality of nodes in the distributed system, a verifying module, the verifying module verifying a non-violation of at least one of a transaction semantics and a replication policy, where the non-violation corresponds to the transaction, a committing module, the committing module committing the transaction to at least one of the plurality of nodes, if the transaction is successful, and an aborting module, the aborting module aborting the transaction, if the transaction fails.

BRIEF DESCRIPTION OF THE DRAWINGS

Embodiments of the present invention will be understood and appreciated more fully from the following detailed description taken in conjunction with the appended drawings in which.

DETAILED DESCRIPTION OF EMBODIMENTS OF THE INVENTION

The present invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

Figure 1:
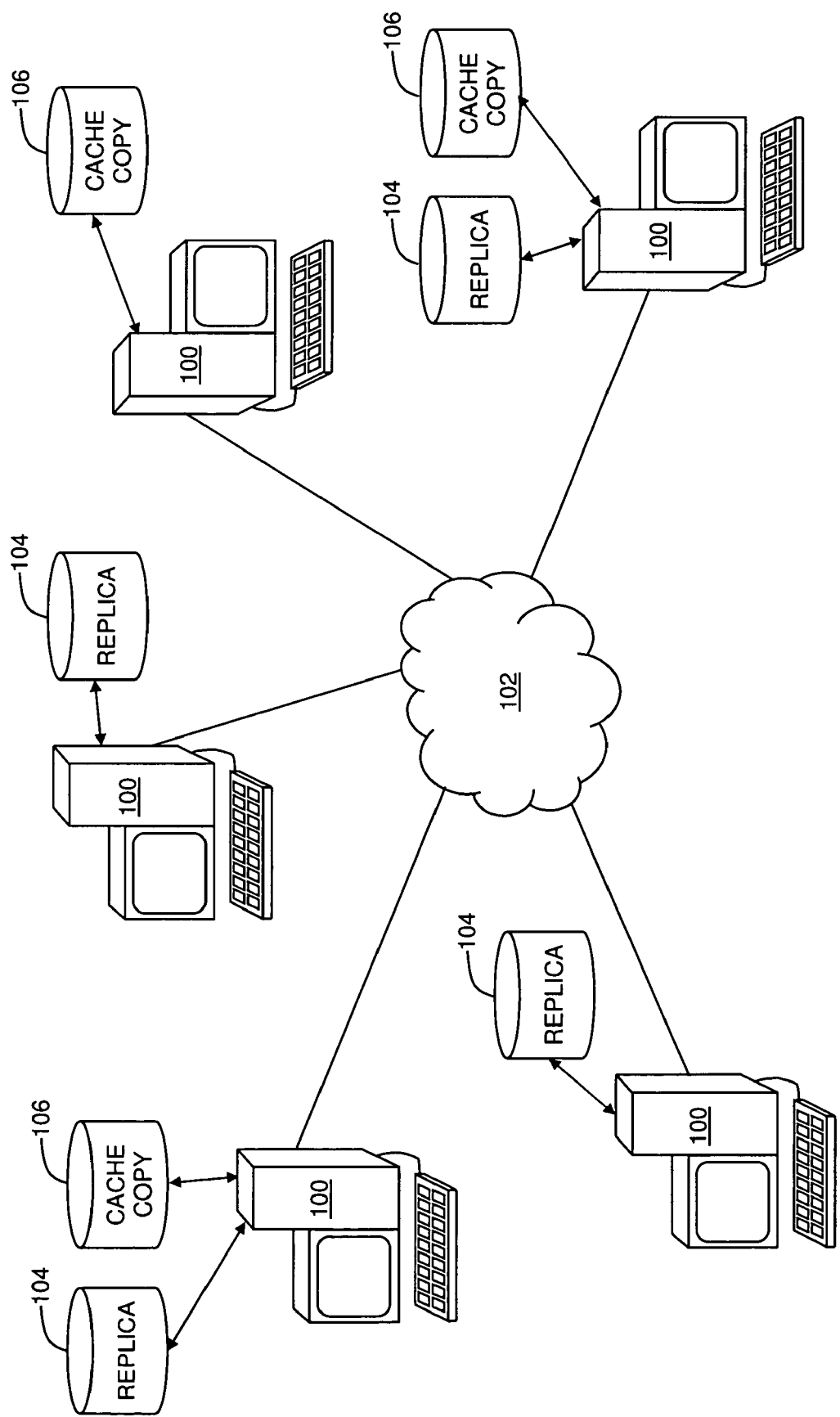
FIG. 1 is a simplified conceptual illustration of a distributed data storage system with transaction rollback support, constructed and operative in accordance with an embodiment of the invention.

Reference is now made to FIG. 1, which is a simplified conceptual illustration of a distributed data storage system with transaction rollback support, constructed and operative in accordance with an embodiment of the invention. In the system of FIG. 1, multiple computer nodes 100 are shown interconnected via a network 102 as a group of nodes, such as may be managed by a distributed group membership system (not shown). Two or more nodes 100 in the group may each maintain a replica 104 of one or more units of data that are collectively maintained by the group, such as where multiple nodes 100 each maintain a replica 104 of a customer database. Each replica 104 is typically "reliable" in that it is designated within the group for data backup purposes and as such is not typically used during transaction processing without the knowledge and consent of the group. Where such consent is given to a node, the node may process a transaction and modify its replica 104 accordingly, typically changing a version state associated with replica 104 to indicate that the replica represents the next version of the data. Any node 100 may additionally or alternatively maintain a cache copy 106 of one or more units of data that are collectively maintained by the group, with cache copy 106 typically being "disposable" in that it is not essential for data backup purposes and may be used and discarded at its node's discretion.

Figure 2:
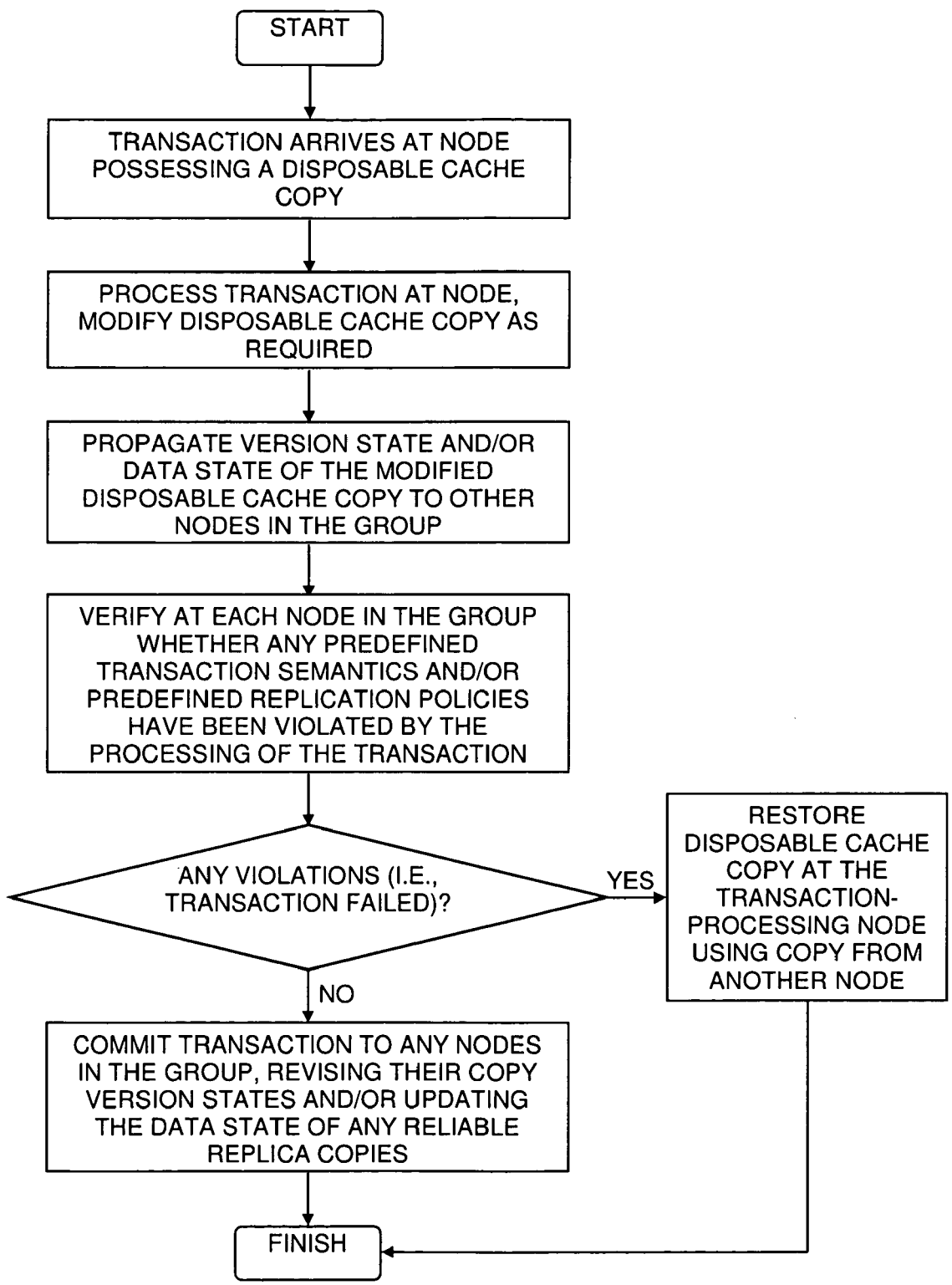
FIG. 2 is a simplified flowchart illustration of an exemplary method of operation of the system of FIG. 1 for providing transaction rollback support, operative in accordance with an embodiment of the invention.

Reference is now made to FIG. 2, which is a simplified flowchart illustration of an exemplary method of operation of the system of FIG. 1 for providing transaction rollback support, operative in accordance with an embodiment of the invention. In the method of FIG. 2, a new transaction arrives for processing at a node possessing a disposable cache copy of a data unit that "corresponds" to the transaction in that the cache copy contains data that is required for processing the transaction and/or that will be changed due to the nature of the transaction. The node then processes the transaction, modifying the disposable cache copy as required to obtain a modified disposable cache copy. A version state and/or a data state of the modified disposable cache copy is then propagated to one or more of the other nodes in the group, whereupon all nodes in the group collectively verify whether any predefined transaction semantics and/or predefined replication policies have been violated by the processing of the transaction. If there are no violations, and the transaction is otherwise successful using any predefined success criteria, the transaction may be committed to any of the nodes in the group, such as any nodes that are members of a membership-based view, by a) revising the version state of their reliable replica copies and/or disposable cache copies based on the version state of the modified disposable cache copy, and/or b) updating the data state of a predefined number of reliable replica copies in the distributed system, such as may be predefined in a policy, based on the data state of the modified disposable cache copy of the transaction-processing node. If the transaction fails, the disposable cache copy at the transaction-processing node is preferably restored based on one or more of the reliable replica copies and/or disposable cache copies in the distributed system.

Figure 3:
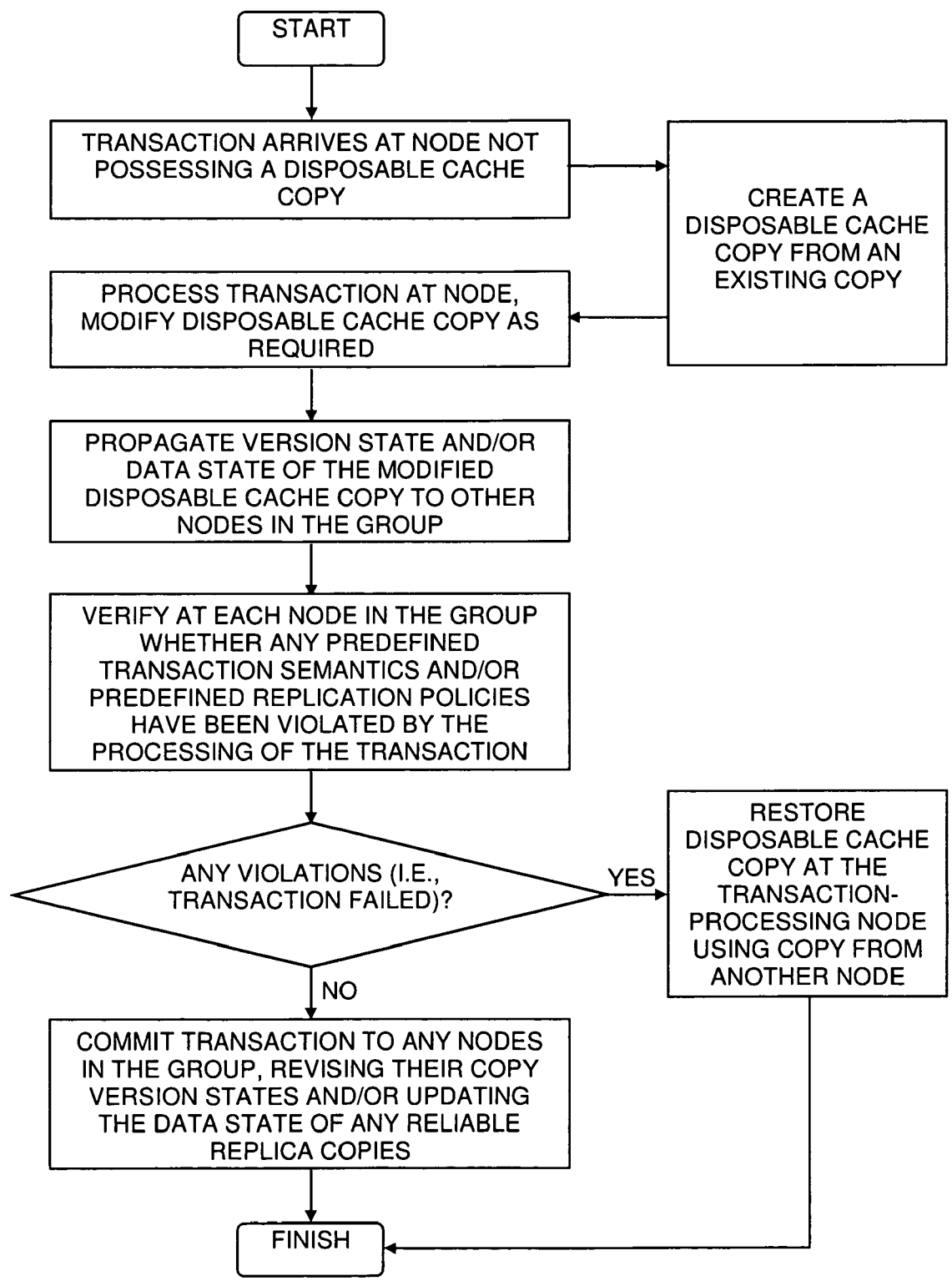
FIG. 3 is a simplified flowchart illustration of an alternative exemplary method of operation of the system of FIG. 1 for providing transaction rollback support, operative in accordance with an embodiment of the invention.
Figure 4:
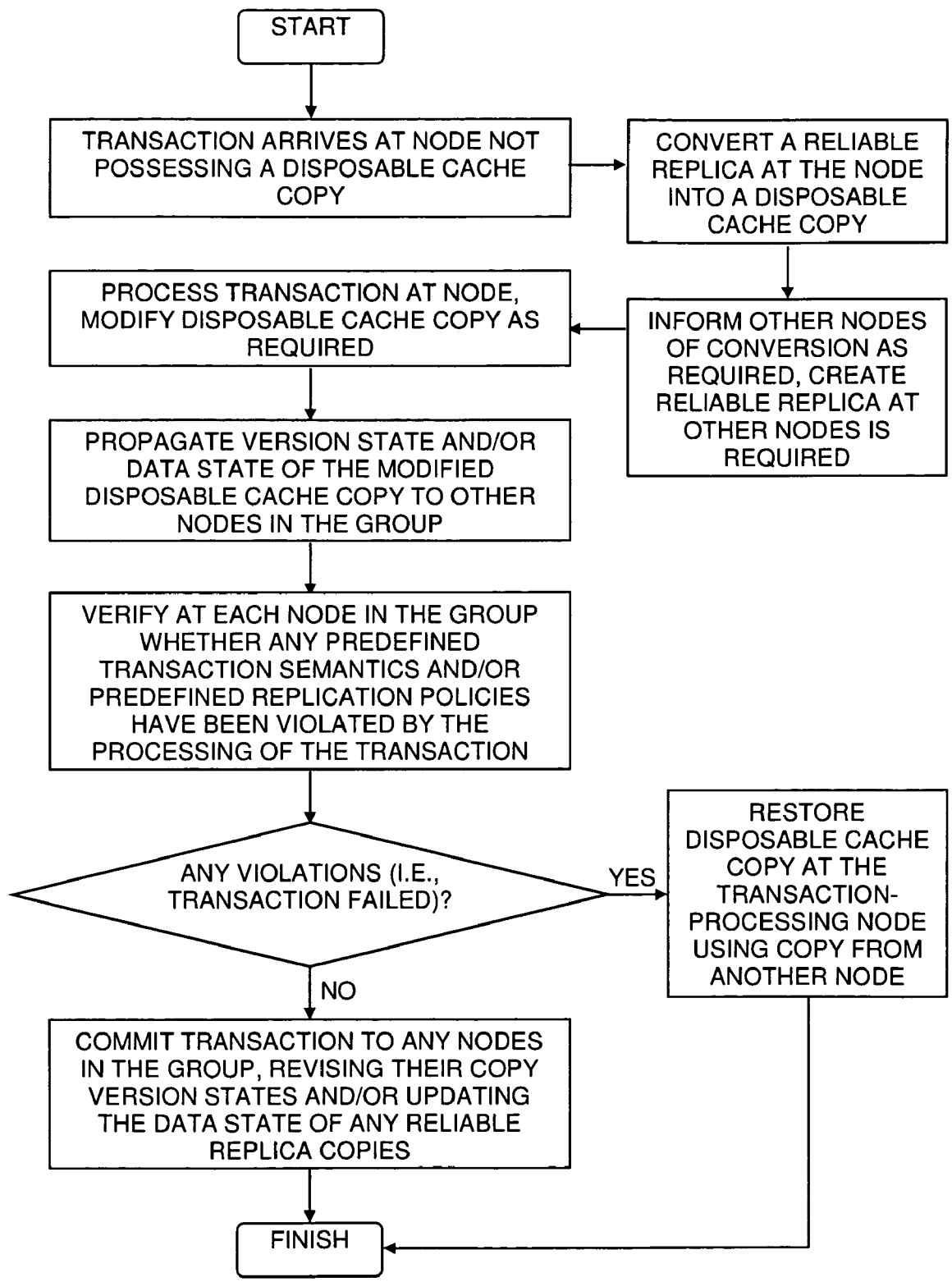
FIG. 4 is a simplified flowchart illustration of an alternative exemplary method of operation of the system of FIG. 1 for providing transaction rollback support, operative in accordance with an embodiment of the invention.

The method of FIG. 2 may be modified as shown in FIG. 3 where, if the transaction-processing node doesn't possess a disposable cache copy, it may create a new disposable cache copy in response to the transaction being initiated at the node. This is done by replicating an existing copy, such as a reliable replica maintained by the transaction-processing node or any copy maintained by any other node. Alternatively, as shown in FIG. 4, the transaction-processing node may convert a reliable replica that it maintains into a disposable cache copy in response to the transaction being initiated at the node. The transaction-processing node may inform one or more members of the group if required by the policy when it converts one of its reliable replicas to a disposable cache copy, whereupon one or more members of the group may, in accordance with a predefined replication policy, create a new reliable replica, such as by copying or converting a disposable cache copy of the same node, or by copying a replica (reliable or disposable) maintained by members of the group other than the same node. The replication policy may include a reliability policy which defines a number of reliable replicas that are to be maintained within the distributed system, such as may be based on a predetermined condition, such as a requirement to maintain at least two reliable replicas. The replication policy may additionally or alternatively include a propagation policy which governs propagation of modified data. For example, one propagation policy might indicate that all reliable copies in a group are to be updated, while another propagation policy might indicate that all copies in the group are to be updated whether they are reliable or not, and still another propagation policy might indicate the updating of all reliable copies and one disposable copy in the group, if a disposable copy exists on a node that does not maintain a reliable replica. The updating may be performed on any of the reliable replicas in the distributed system and/or on any of the disposable cache copies in the distributed system, based on the modified disposable cache copy. The replication policy may additionally or alternatively include a conversion policy which determines when a reliable replica may be converted to a disposable cache copy, such as may be based on a predetermined condition. For example, such a condition might be a guarantee, based on the current dynamic state of the system, that at least one reliable copy will remain after the conversion takes place. The processing of a transaction may be determined to be successful if one or more transaction semantics and/or one or more replication policies are non-violated.

Communication between nodes, such as for verifying adherence to transaction semantics and policies and for committing the transaction, is preferably performed using ordered group communication methods in accordance with conventional techniques. Using these techniques, group membership information may be provided to a node by the group membership service of the underlying group communication system, with the membership information being used by dynamic policies to ensure non-violation of replication policies and transactional semantics. A "dynamic policy" is defined herein as one that refers to dynamic system state, i.e., a state that changes over time as nodes fail and new nodes join the system. An example of a dynamic policy may include a policy that requires all members of a group to maintain a reliable replica. Such a dynamic policy requires knowledge of the current group membership, which may change over time. The membership information may be used by any node to determine the number of nodes in the distributed system, as well as the number of reliable replicas that the system maintains, such as a desired number of reliable replicas in accordance with predefined policies. Using this information, the propagation of the modified disposable cache copy, representing the new version of its corresponding data unit, may be controlled using a standard scheme. Knowing the number of nodes in the distributed system, as well as the desired number of reliable replicas that the system is to maintain as dictated by policy, the transaction-processing node preferably propagates the new object version to members of a membership-based view, and the new object data replica to the policy-based number of nodes. The version control scheme is preferably employed for the distributed system, where verifying adherence to transaction semantics and policies includes checking for non-violation of the transaction semantics on a new object version and checking for non-violation of the replication policy on a new object data replica.

Figure 5:
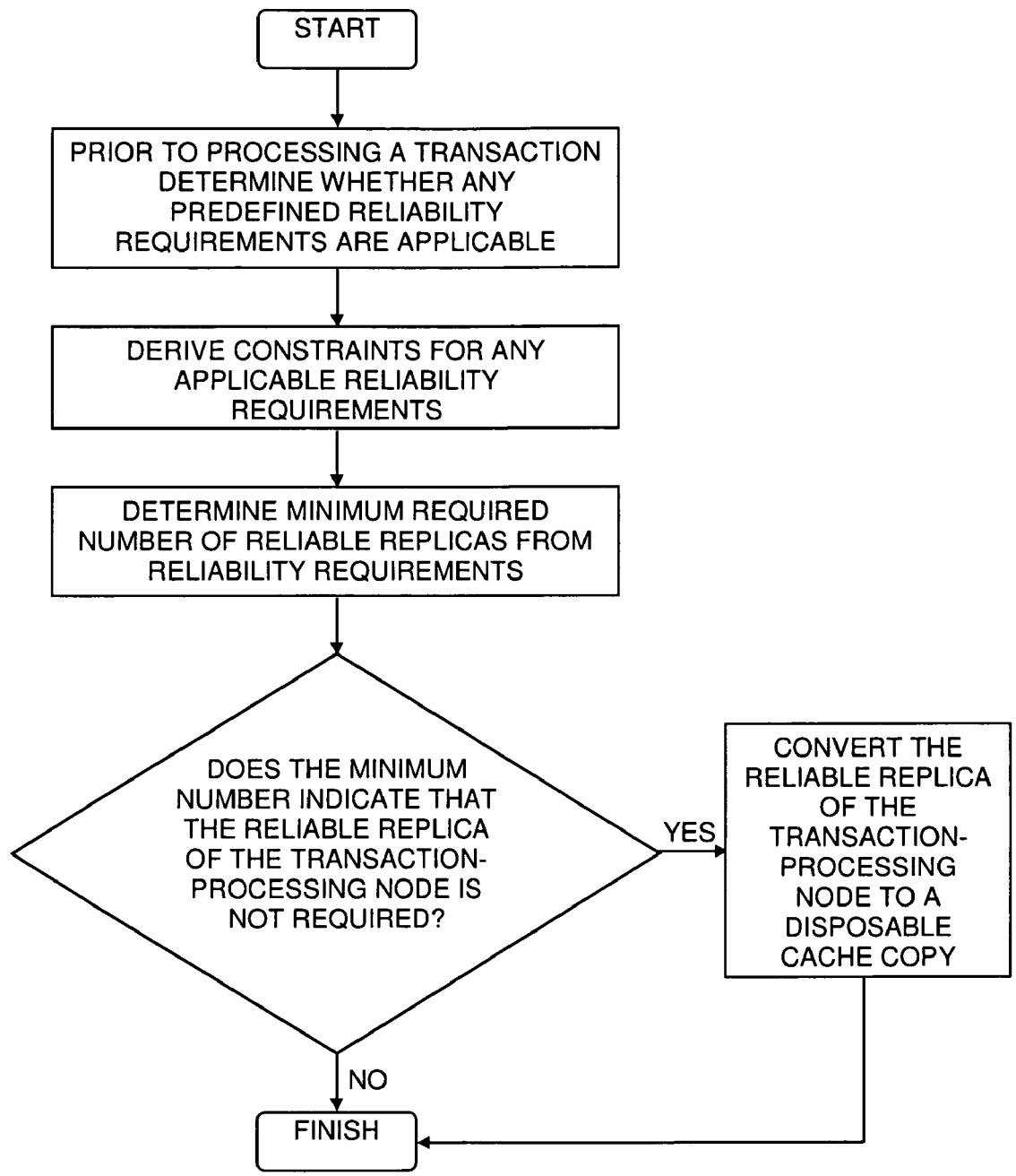
FIG. 5 is a simplified flowchart illustration of an exemplary method of operation of the system of FIG. 1 for managing the processing of a transaction in a distributed system, operative in accordance with an embodiment of the invention.

Reference is now made to FIG. 5, which is a simplified flowchart illustration of an exemplary method of operation of the system of FIG. 1 for managing the processing of a transaction in a distributed system, operative in accordance with an embodiment of the invention. In the method of FIG. 5, prior to processing a transaction, the transaction-processing node determines whether any predefined reliability requirements are applicable to the processing of the transaction. For each applicable reliability requirement, one or more constraints are derived, possibly dynamically depending on the policy, from the reliability requirement to determine a minimum number of reliable replicas of the data unit that are required to be maintained by the distributed system at a given time. If the minimum number indicates that the reliable replica of the transaction-processing node is not required (i.e., the number of reliable replicas at the other nodes in the group equals or exceeds the minimum number), the reliable replica of the transaction-processing node may be toggled to become a disposable cache copy as described hereinabove. A specific set of the nodes in the distributed system may be assigned the minimum number of reliable replicas of the data unit based on a state of the nodes in the distributed system.

Figure 6:
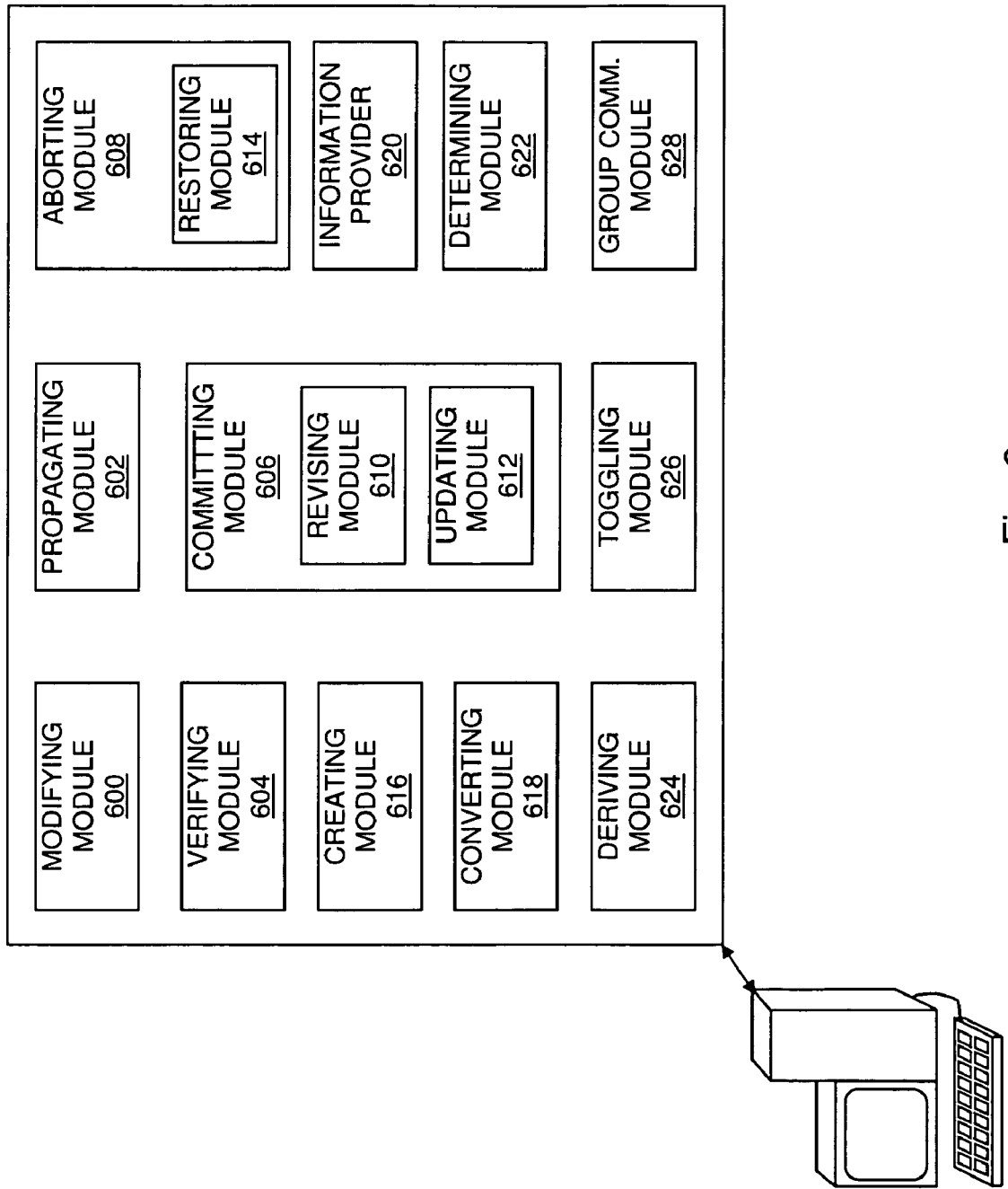
FIG. 6 is a simplified block diagram illustration of an exemplary implementation the system of FIG. 1 as a collection of components implemented as computer hardware and/or software, constructed and operative in accordance with an embodiment of the invention.

Reference is now made to FIG. 6, which is a simplified block diagram illustration of an exemplary implementation the system of FIG. 1 as a collection of components implemented as computer hardware and/or software, constructed and operative in accordance with an embodiment of the invention. In FIG. 6, the system of FIG. 1 is implemented using the following components:

a modifying module 600 configured to modify a disposable cache copy of a data unit corresponding to a transaction at a node to obtain a modified disposable cache copy, upon processing the transaction;

a propagating module 602 configured to propagate a version state and/or a data state corresponding to the modified disposable cache copy to one or more of the plurality of nodes in the distributed system;

a verifying module 604 configured to verify a non-violation of a transaction semantic and/or a replication policy as a result of processing the transaction;

a committing module 606 configured to commit the transaction to any of the nodes if the transaction is successful; and an aborting module 608 configured to abort the transaction if the transaction fails.

The committing module is shown as having the following modules:

a revising module 610 configured to revise a version state of a reliable replica and/or of a disposable cache copy in the distributed system based on the version state of the modified disposable cache copy, the disposable cache copies belonging to members of a membership-based group view; and an updating module 612 configured to update a data state of a policy-based number of reliable replicas in the distributed system, based on the data state of the modified disposable cache copy of the node.

Aborting module 608 may include a restoring module 614 which is configured to restore the disposable cache copy at the transaction-processing node based on another reliable replica and/or another disposable cache copy in the distributed system.

The implementation shown in FIG. 6 may also include any of the following components:

a creating module 616 configured to create a new disposable cache copy in response to the transaction being initiated at the node, where the new copy is based on a reliable replica, if a disposable cache copy of the data unit corresponding to the transaction is absent at the node;

a converting module 618 configured to convert a reliable replica of the data unit at the node into the disposable cache copy in response to the transaction being initiated at the node, if the node has a reliable replica of the data unit corresponding to the transaction;

an information provider 620 configured to provide membership information to the node, the membership information ensuring non-violation of the replication policy, and used to derive a number of the nodes in the distributed system and a policy-based number of reliable replicas in the distributed system;

a determining module 622 configured to determine at least one reliability requirement;

a deriving module 624 configured to derive a constraint on a minimum number of reliable replicas of a data unit required in the distributed system at a given time;

a toggling module 626 configured to toggle a reliable replica of a data unit into a disposable cache copy of the data unit and back, based on a replication policy; and a group communication module 628 for performing ordered and reliable group communication in accordance with conventional techniques.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

What is claimed is:

1. A method for providing rollback support for a transaction initiated at a node, the node being one of a plurality of nodes in a distributed system, a reliable replica and a disposable cache copy of a data unit corresponding to the transaction being stored on the plurality of nodes, the data unit comprising a version state and a data state, the method comprising:

modifying a disposable cache copy of a data unit corresponding to a transaction at a node comprising the disposable cache copy;

obtaining, in response to the modifying, a modified disposable cache copy;

propagating at least one of a version state and a data state corresponding to the modified disposable cache copy to one or more of a plurality of nodes in a distributed system;

determining, by each of the one or more of the plurality of nodes in response to receiving the at least one of the version state and the data state, a non-violation, with respect to the transaction, of at least one of a set of transaction semantics and a set of replication policies; and managing a commitment of the transaction at the disposable cache copy based on the non-violation that has been determined, wherein managing the commitment further comprises:

determining that at least a first node in the plurality of nodes fails to comprise a disposable cache copy of the data unit, the first node comprising a reliable replica copy of the data unit is designated as a backup copy for the data unit; and converting the at least one reliable replica copy at the first node into a converted disposable cache copy of the data unit.

2. The method of claim 1, wherein the managing a commitment of the transaction at the disposable cache copy further comprises:

retaining the modified disposable cache copy in response to a non-violation being determined.

3. The method of claim 2, wherein the managing a commitment of the transaction at the disposable cache copy further comprises:

aborting the transaction; and restoring the disposable cache copy at the node based on a set of reliable replicas of the data unit in the distributed system.

4. The method of claim 3, wherein the set of reliable replicas reside on the one or more of a plurality of nodes.

5. The method of claim 1, wherein the managing a commitment of the transaction at the disposable cache copy further comprises:

aborting the transaction; and restoring the disposable cache copy at the node based on a set of disposable cache copies of the data unit in the distributed system.

6. The method of claim 5, wherein the set of disposable cache copies reside on the one or more of a plurality of nodes.

7. A method for providing rollback support for a transaction initiated at a node, the node being one of a plurality of nodes in a distributed system, a reliable replica and a disposable cache copy of a data unit corresponding to the transaction being stored on the plurality of nodes, the data unit comprising a version state and a data state, the method comprising:

modifying a disposable cache copy of a data unit corresponding to a transaction at a node comprising the disposable cache copy;

obtaining, in response to the modifying, a modified disposable cache copy at the node;

propagating a version state and a data state corresponding to the modified disposable cache copy to each node in a plurality of nodes in a distributed system, wherein each node in the of the plurality of nodes comprises at least one reliable replica copy of the data unit, wherein the at least one reliable replica copy is designated as a backup copy for the data unit and is prevented from being used during transaction processing at the node comprising the at least one reliable replica copy, and wherein at least a set of the plurality of nodes each comprise a disposable cache copy of the data unit, wherein the disposable cache copy is a local copy of the data unit specific to the node comprising the disposable cache copy, wherein the disposable cache copy is used during transaction processing at the node and is prevented from being used for backing up the data unit;

determining, by each of the one or more of the plurality of nodes in response to receiving the version state and the data state, a non-violation, with respect to the transaction, of a set of transaction semantics and a set of replication policies;

determining that the transaction at the node comprising the modified disposable cache copy was successful;

committing the transaction to the plurality of nodes in response to the non-violation being determined and the transaction being successful, wherein the committing further comprises:

revising a version state of the at least one reliable replica copy of the data unit at each of the plurality of nodes based on the version state of the modified disposable cache copy;

updating a data state of the at least one reliable replica copy of the data unit at each of the plurality of nodes based on the data state of the modified disposable cache copy;

determining that at least a first node in the plurality of nodes fails to comprise a disposable cache copy of the data unit;

creating a new disposable cache copy at the first node from the at least one reliable replica copy residing at the first node;

revising a version state of the new disposable cache copy based on the version state of the modified disposable cache copy;

updating a data state of the new disposable cache copy based on the data state of the modified disposable cache copy;

determining that at least a second node in the plurality of nodes fails to comprise a disposable cache copy of the data unit;

converting the at least one reliable replica copy at the second node into a converted disposable cache copy of the data unit;

revising a version state of the converted disposable cache copy based on the version state of the modified disposable cache copy; and updating a data state of the converted disposable cache copy based on the data state of the modified disposable cache copy.

8. The method of claim 7, wherein the a set of replication policies comprises at least one of a reliability policy wherein a number of reliable replicas required in the distributed system is determined based on a first predetermined condition, a propagation policy wherein a set of nodes to be updated is determined based on a second predetermined condition, and a conversion policy wherein at least one reliable replica copy to be converted to a disposable cache copy is determined based on a third predetermined condition.

9. The method of claim 8, wherein any of the policies and conditions used to determine the number of reliable replica copies is derived dynamically.

10. The method of claim 9, wherein the plurality of nodes are assigned a minimum number of the reliable replica copies of the data unit based on a state of the plurality of nodes in the distributed system.

11. A computer readable storage medium for providing rollback support for a transaction initiated at a node, the node being one of a plurality of nodes in a distributed system, a reliable replica and a disposable cache copy of a data unit corresponding to the transaction being stored on the plurality of nodes, the data unit comprising a version state and a data state, the computer readable storage medium comprising instructions for:

modifying a disposable cache copy of a data unit corresponding to a transaction at a node comprising the disposable cache copy;

obtaining, in response to the modifying, a modified disposable cache copy;

propagating at least one of a version state and a data state corresponding to the modified disposable cache copy to one or more of a plurality of nodes in a distributed system;

determining, by each of the one or more of the plurality of nodes in response to receiving the at least one of the version state and the data state, a non-violation, with respect to the transaction, of at least one of a set of transaction semantics and a set of replication policies; and managing a commitment of the transaction at the disposable cache copy based on the non-violation that has been determined, wherein managing the commitment further comprises:

determining that at least a first node in the plurality of nodes fails to comprise a disposable cache copy of the data unit, the first node comprising a reliable replica copy of the data unit is designated as a backup copy for the data unit; and converting the at least one reliable replica copy at the first node into a converted disposable cache copy of the data unit.

12. The computer readable storage medium of claim 11, wherein the managing a commitment of the transaction at the disposable cache copy further comprises:

retaining the modified disposable cache copy in response to a non-violation being determined.

13. The computer readable storage medium of claim 11, wherein the managing a commitment of the transaction at the disposable cache copy further comprises:

aborting the transaction; and restoring the disposable cache copy at the node based on a set of reliable replicas of the data unit in the distributed system.

14. The computer readable storage medium of claim 13, wherein the set of reliable replicas reside on the one or more of a plurality of nodes.

15. The computer readable storage medium of claim 11, wherein the managing a commitment of the transaction at the disposable cache copy further comprises:

aborting the transaction; and restoring the disposable cache copy at the node based on a set of disposable cache copies of the data unit in the distributed system.

16. The computer readable storage medium of claim 15, wherein the set of disposable cache copies reside on the one or more of a plurality of nodes.

* * * * *